United States Patent [19]

Matsushita

[11] Patent Number: 5,194,772
[45] Date of Patent: Mar. 16, 1993

[54] A-C DRIVEN MOTOR AND METHOD FOR FORMING INPUT TERMINALS THEREOF

[75] Inventor: Ikuo Matsushita, Matsudo, Japan

[73] Assignee: Mabuchi Motor Co., Ltd., Chiba, Japan

[21] Appl. No.: 728,118

[22] Filed: Jul. 10, 1991

[30] Foreign Application Priority Data

Jul. 13, 1990 [JP] Japan ................................ 2-75126[U]

[51] Int. Cl.$^5$ .......................................... H02K 11/00
[52] U.S. Cl. ..................................... 310/71; 310/68 D
[58] Field of Search ............... 310/68 D, 71; 439/217, 439/220, 221, 516, 733

[56] References Cited

U.S. PATENT DOCUMENTS

| | | |
|---|---|---|
| 3,467,941 | 9/1969 | Martin . |
| 4,593,220 | 6/1986 | Cousins et al. ................... 310/71 X |
| 4,845,396 | 7/1989 | Huber ................................ 310/71 X |
| 4,926,075 | 5/1990 | Fushiya et al. .................... 310/71 X |
| 4,992,688 | 2/1991 | Cap et al. ............................. 310/71 |
| 5,008,574 | 4/1991 | Kitahata ............................. 310/71 |

Primary Examiner—Steven L. Stephan
Assistant Examiner—Ed To
Attorney, Agent, or Firm—McGlew and Tuttle

[57] ABSTRACT

An ac motor comprises a dc micromotor with terminals passing through an insulating end bell to receive dc current from a rectifier module. The flat surface of the end bell contains fixing grooves and a hole. The rectifier module is fitted within the hole. Fixing bosses are also provided on the end surface of the end bell. An input terminal plate is provided with holes for engaging the four bosses. The input terminal plate is provided with cut grooves which delimit four input terminal portions. The input terminal plate also has a middle hole. The input terminal plate is pressed into engagement with the four bosses resulting in the input terminal plate separating into four input terminal pieces, which are bent into the fixing grooves and also bent into the hole to fixedly fit the input terminal pieces to the end bell. Terminals of the rectifier module are electrically and mechanically connected to be held by the input terminal pieces.

7 Claims, 2 Drawing Sheets

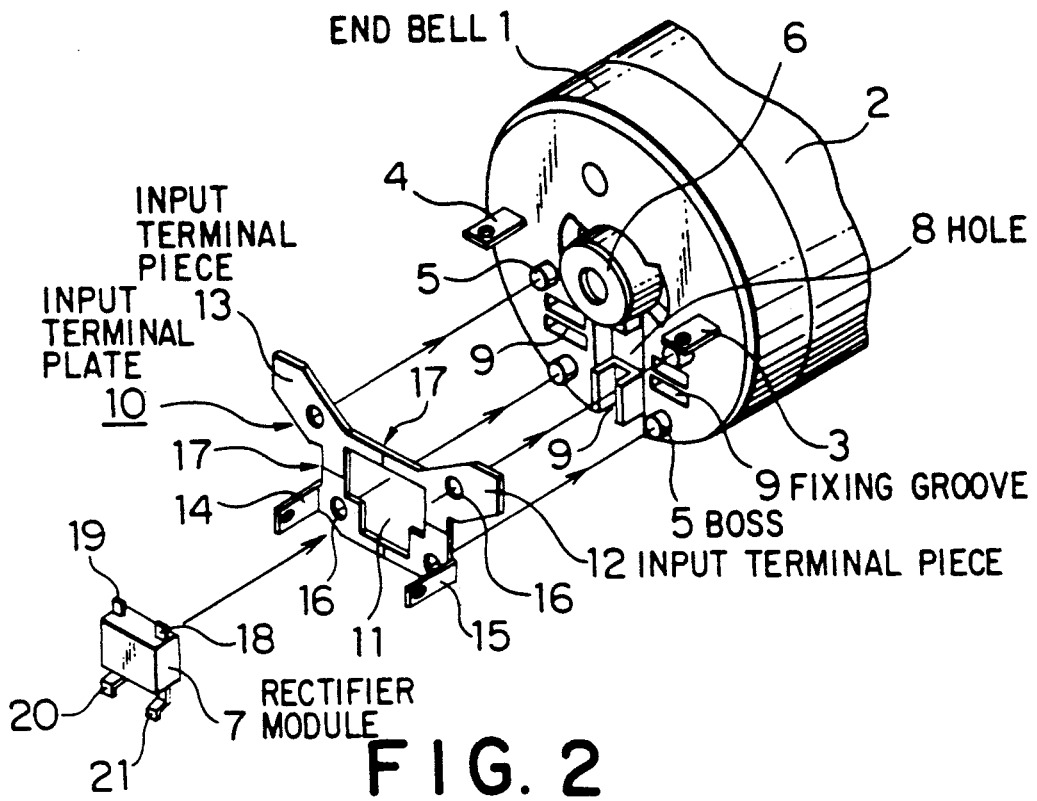
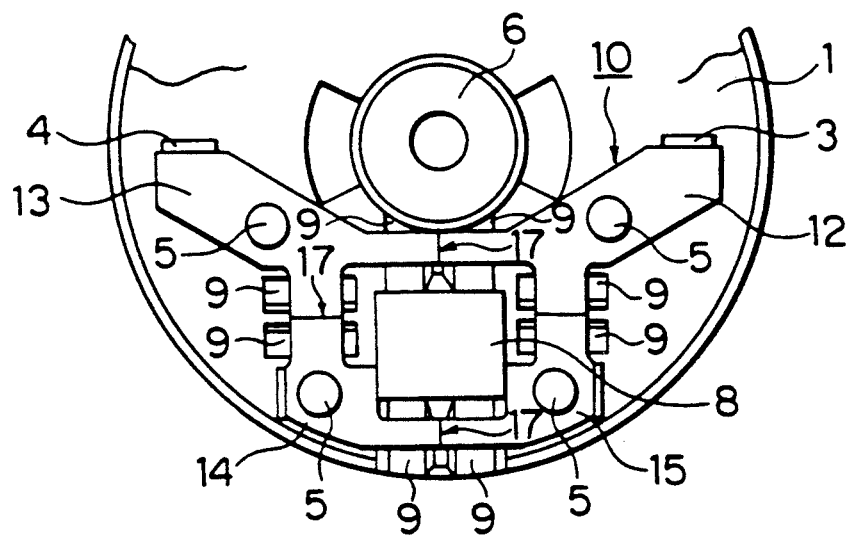
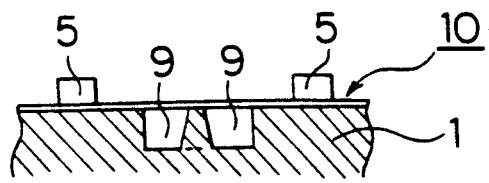

A-C DRIVEN MOTOR AND METHOD FOR FORMING INPUT TERMINALS THEREOF

BACKGROUND OF THE INVENTION

1. Field of the Invention

This invention relates generally to an ac-driven motor, and more particularly to the assembly and construction of an ac-driven motor comprising a micromotor having a rectifier for converting ac current into dc current to allow the motor to be driven by an ac power source, in which the rectifier can be easily connected to and held by the motor.

2. Description of the Prior Art

In conventional motors, a rectifier is installed on the motor in such a manner that rectifier elements are assembled into parallel crosses, with the positive and negative output terminals being directly connected to the motor terminals, and the ac input terminals being connected to the ac power line via staking hardware for the external connection (refer to Japan Utility Model Publication No. 34869-1986).

SUMMARY OF THE INVENTION

It is an object of this invention to provide an ac-driven motor in which an ac/dc converter portion can be automatically assembled.

It is another object of this invention to provide an ac driven motor requiring a small space for the components of the ac/dc converter.

It is still other object of this invention to provide an ac-driven motor in which the ac/dc converter components can be automatically assembled into an end bell.

It is still other object of this invention to provide a method for forming input terminals for fixedly fitting and forming four input terminal pieces in the end bell.

BRIEF DESCRIPTION OF THE DRAWINGS

FIG. 1 is a partially exploded perspective view of ac/dc converter components assembled into an end bell.

FIG. 2 is a partial front view illustrating the state where an input terminal plate is engaged with bosses.

FIG. 3 is a partial bottom view of the same.

DETAILED DESCRIPTION OF PREFERRED EMBODIMENTS

Figure 4:
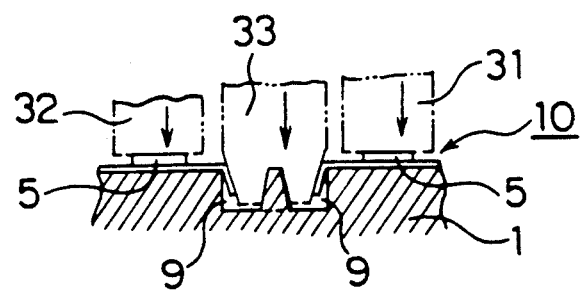
FIG. 4 is a diagram of assistance in explaining the state where the input terminal plate is cut apart and fixedly fitted by means of jigs.

In FIGS. 1 through 5, an end bell made of an insulating material, such as a plastic material, holds brushes in the inside thereof, and the brushes are disposed in such a fashion that when the end bell 1 is fitted to a motor case 2, the brushes make contact with a commutator (not shown). Terminal portions 3 and 4 passed through the end bell 1, and are electrically connected to the brushes. Four bosses 5 are provided on the surface of the end bell 1 on which the terminal portions 3 and 4 are provided.

In the middle of the end bell 1 there is a bearing mount 6, and a hole 8 into which a rectifier module 7 is fitted is provided at a position slightly below the bearing mount 6. On each of the four sides of the hole 8 there are two parallel fixing grooves 9.

Numeral 10 indicates an input terminal plate in the middle of which a hole 11, having a size enough to accommodate the rectifier module 7, is provided in the state before the input terminal plate 10 is cut apart. At each of the four corners of the input terminal plate 10 there are input terminal pieces 12 through 15, and holes 16 engaging the four bosses 5 are provided. On the input terminal plate 10, cut grooves (score lines) 17 facilitate the cutting of the input terminal portions to form input terminal pieces 12 through 15, as will be described later.

The rectifier module 7 is a surface-mount type small rectifier on the top end of which positive and negative terminals 18 and 19 are formed, and on the bottom end of which ac input terminal 20 and 21 are formed. The rectifier module 7 has an external shape that can be fitted into the hole 8 provided on the end bell 1.

Since the rectifier element for converting ac current into dc current as a surface-mount type rectifier module has such a construction as to be fitted to a hole 8 provided on the end bell 1, the rectifier element requires a small space.

Prior to installing the rectifier module 7, the input terminal plate 10 as shown in FIG. 1 (the input terminal pieces 14 and 15 of which need not be bent in advance as shown in the figure) is fitted to the end bell 1 using positioning/fixing bosses 5, as shown in FIGS. 2 and 3.

Figure 5:
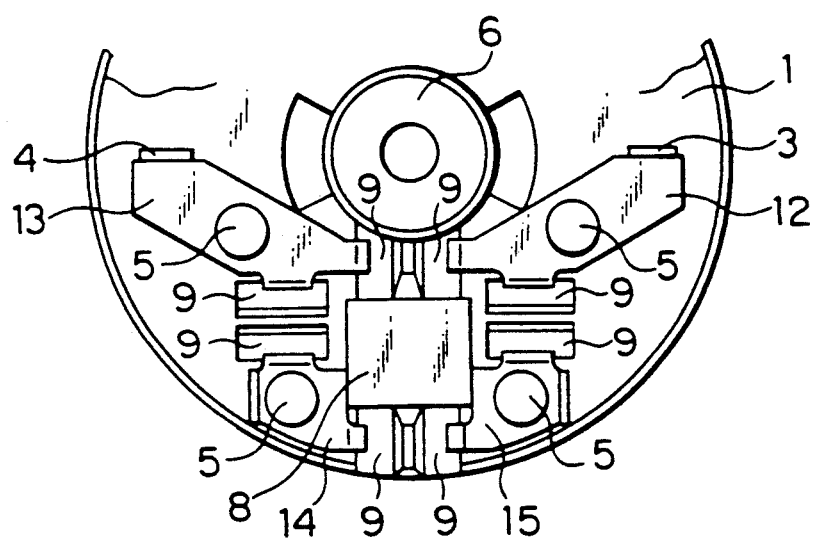
FIG. 5 is a partial front view illustrating the state where the input terminal plate is cut apart and fixedly fitted to the end bell.

In this state, as jigs 31 through 33 shown by imaginary lines in FIG. 4 are moved together in the direction shown in the figure, the input terminal plate 10 is cut apart at four cut grooves 17 provided on the input terminal plate 10, and bent along the fixing grooves 9. At the same time, the heads of the four bosses 5 are upset so that each of the input terminal pieces 12 through 15 are fixedly fitted to the surface of the end bell 1 in a separated state, as shown in FIG. 5.

Figure 6:
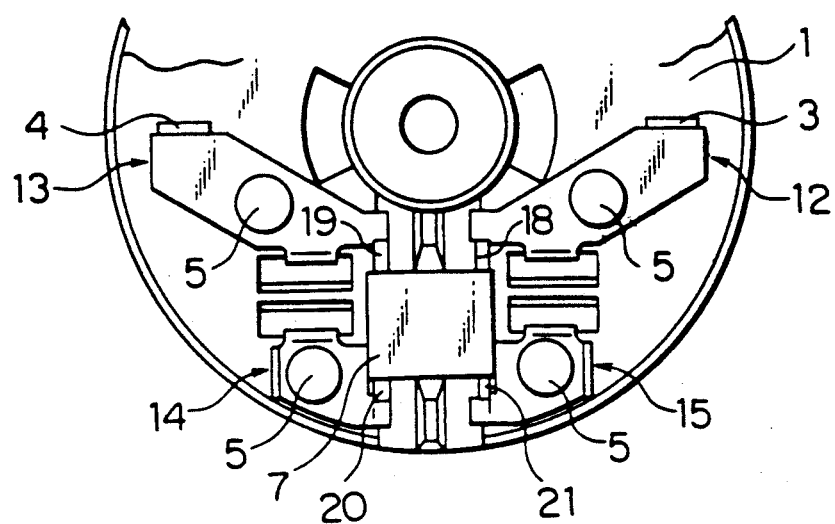
FIG. 6 is a partial front view of the end bell to which a rectifier module is installed.

FIG. 6 is a diagram illustrating the state where the rectifier is installed on the end bell. The rectifier module 7 shown in FIG. 1 is fitted into the hole 8 provided on the end bell 1. As the positive and negative terminals 18 and 19 and the ac input terminals 20 and 21 are soldered to the corresponding input terminal pieces 12 through 15, and the input terminal pieces 12 and 13 are soldered to the adjacent terminal portions 3 and 4, the rectifier module 7 is fixedly fitted into the hole 8 of the end bell.

In this embodiment, the input terminal pieces 12 and 13 are caused to make linear contact with and soldered to the terminal portions 3 and 4. The input terminal pieces 12 and 13, however, may be caused to make surface contact with the terminal portions 3 and 4 by providing bent portions on the input terminal pieces 12 and 13 before soldered to the terminal portions 3 and 4.

Although each of the input terminal pieces 12 through 14 is fixedly fitted to the end bell 1 with a boss 5 and two bent portions, each input terminal piece may be fixedly fitted to the end bell 1 using a boss and a bent portion.

In an automatic assembly operation, the input terminal plate 10 is slid onto the end bell 1 using four bosses 5 as guides, and cut apart into the input terminal pieces 12 through 14 using jigs, as shown in FIG. 4. The input terminal pieces 12 through 14 are fixedly fitted to the end bell 1 by bending the bent portions of the input terminal pieces 12 through 14 and upsetting the heads of the bosses 5. The rectifier module 7 is fitted into the hole 8 and each portion is soldered.

When ac voltage is fed from the bent lead wires (not shown) of the input terminal pieces 14 and 15, ac power is applied to the terminal portions 3 and 4 to cause the micromotor to rotate.

As described above, this invention makes it possible to automatically assemble rectifiers into micromotors with machines and achieve improved productivity by providing a construction in which an input terminal plate is cut apart into 4 input terminal pieces, which are fixedly fitted to the surface of the end bell. In addition, since the rectifier is fixedly fitted after all the terminals thereof are soldered to the four input terminal pieces, the unstable state of the rectifier can be eliminated. Furthermore, this invention makes it possible to reduce the size of motors by using rectifier modules, that is, surface-mount type small rectifiers, and providing an arrangement in which the rectifier module is fitted into the hole of the end bell.

Moreover, as the input terminal pieces are soldered to the terminals of the rectifier module, the input terminal pieces act as heat radiators to dissipate heat in the motor.

When soldering operation is performed manually, the soldering of the input terminal pieces to the terminals of the rectifier or the lead wires is made easier since each of the input terminal pieces is fixedly fitted to the end bell. Thus, productivity can be improved even when soldering is performed manually.

What is claimed is:

1. An ac-driven motor construction in the form of a micromotor having at least two terminal portions passed through an insulating end bell with an end surface, the motor being energized upon feeding dc current to said terminal portions, the motor arrangement further comprising:
    a rectifier module for converting ac power into dc power;
    fixing grooves and a hole defined by said end surface of said end bell, said rectifying module being fitted in said hole, and at least four positioning and fixing bosses provided on said end surface of said end bell;
    an input terminal plate defining holes for engaging said bosses, said input terminal plate being formed with cut grooves dividing said input terminal plate into four input terminal portions, said input terminal plate having a hole for accomodating said rectifier module in a middle of said input terminal plate, said input terminal plate being pressed into engagement with said four bosses and being partitioned with said input terminal portions forming separate input terminal pieces bent into corresponding ones of said fixing grooves and said input terminal pieces being bent into said hole to fixedly fit said input terminal pieces to said end bell, terminals of said rectifier module being electrically and mechanically connected to be held by said input terminal pieces.

2. An ac-driven motor arrangement according to claim 1, wherein said rectifier module includes two ac input terminals provided on opposite sides to positive and negative output terminals of said rectifier module, providing four rectifier terminals, said four rectifier terminals being swatted and fixedly fitted to said input terminal pieces.

3. An ac driven motor comprising a micromotor having at least two terminal portions passed through an insulating end bell, with an end surface the motor being energized upon feeding dc current to said terminal portions, the motor further comprising:
    a rectifier module for converting ac power into dc power,
    fixing grooves and a hole into which said rectifier module is fitted provided on said end surface of said end bell, and at least four positioning and fixing bosses provided on said end surface of said end bell,
    an input terminal plate having holes for engaging with said four bosses, having four input terminal portions and having a hole for accommodating said rectifier module in the middle thereof; said input terminal plate having such a construction that when said input terminal plate is engaged with said four bosses and pressed, said input terminal plate is partitioned with said input terminal portions becoming input terminal pieces bent into said fixing grooves and said hole to fixedly fit said input terminal pieces to said end bell; and
    terminals of said rectifier module being electrically and mechanically connected to and held by said input terminal pieces.

4. An a-c-driven motor as set forth in claim 3 wherein said rectifier module has such a construction that two a-c input terminals of said rectifier module are provided on the opposite side to positive and negative output terminals thereof, said rectifier module is fitted into a hole provided on said end bell, and the four terminals are soldered and fixedly fitted to said input terminal pieces.

5. An a-c-driven motor as set forth in claim 3 wherein out grooves for cutting part said input terminal plate are provided on said input terminal plate.

6. An a-c-driven motor as set forth in claim 3 wherein positive and negative input terminal pieces of said input terminal plate make linear contact with said terminal portions.

7. An a-c-driven motor as set forth in claim 3 wherein bent portions are provided on positive and negative input terminal pieces of said input terminal plate so that said bent portions make surface contact with said terminal portions.

* * * * *